Figure 1:
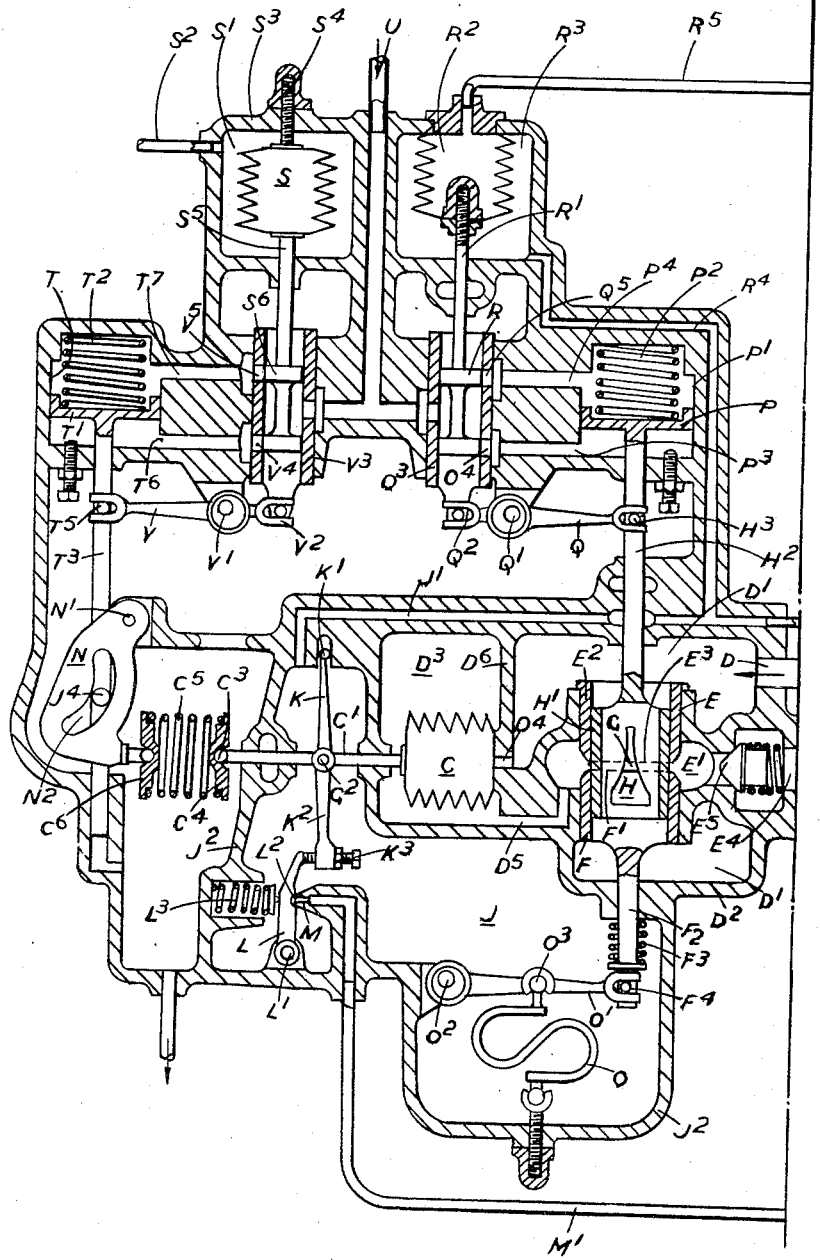

Aug. 23, 1949.  R. H. D. CHAMBERLIN ET AL  2,479,813
FUEL FEED APPARATUS FOR GAS TURBINES
Filed July 1, 1947  3 Sheets-Sheet 1

Inventor
Reginald H. D. Chamberlin, Charles
H. L. Wynne and John Skellern
By Emery, Holcombe & Blair
Attorney

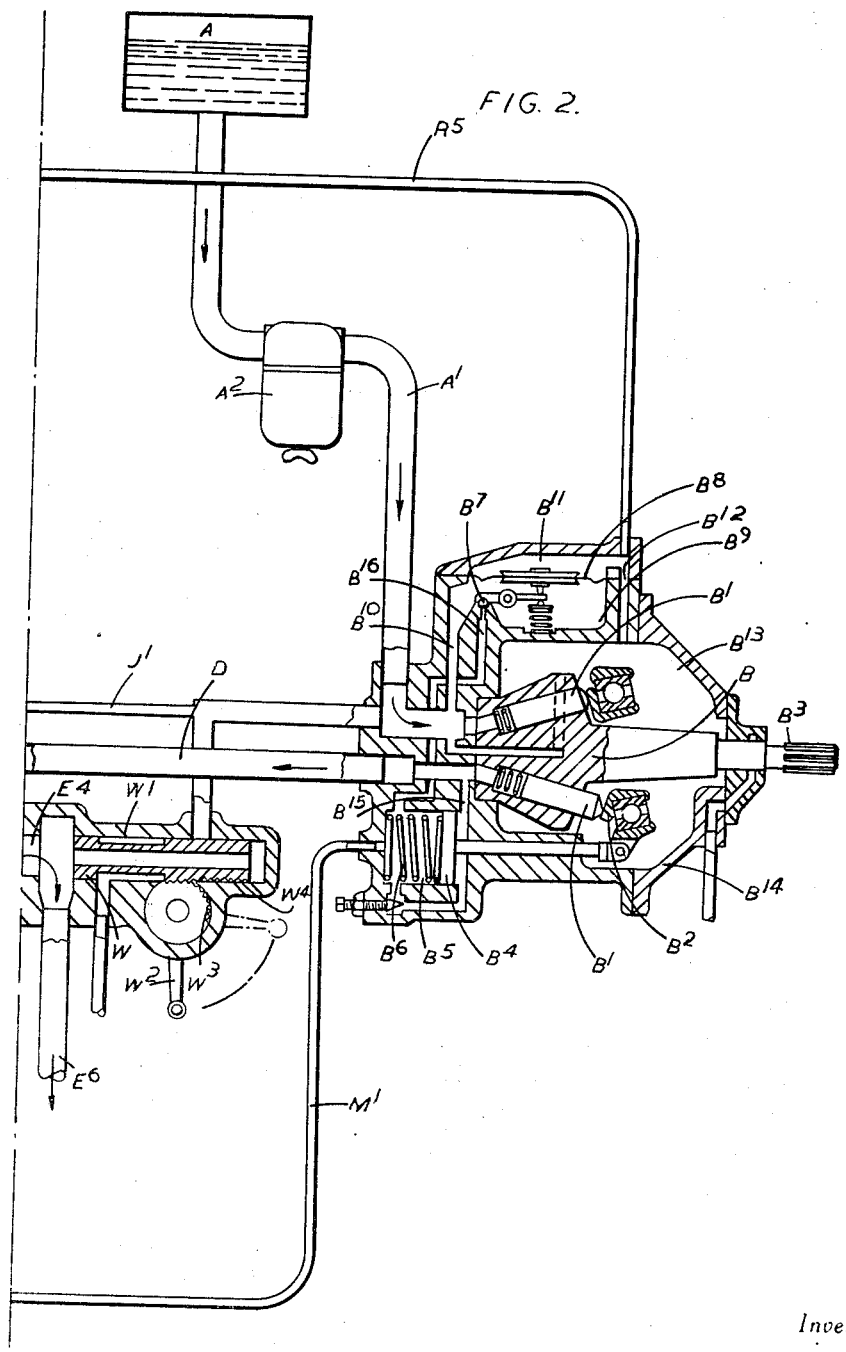

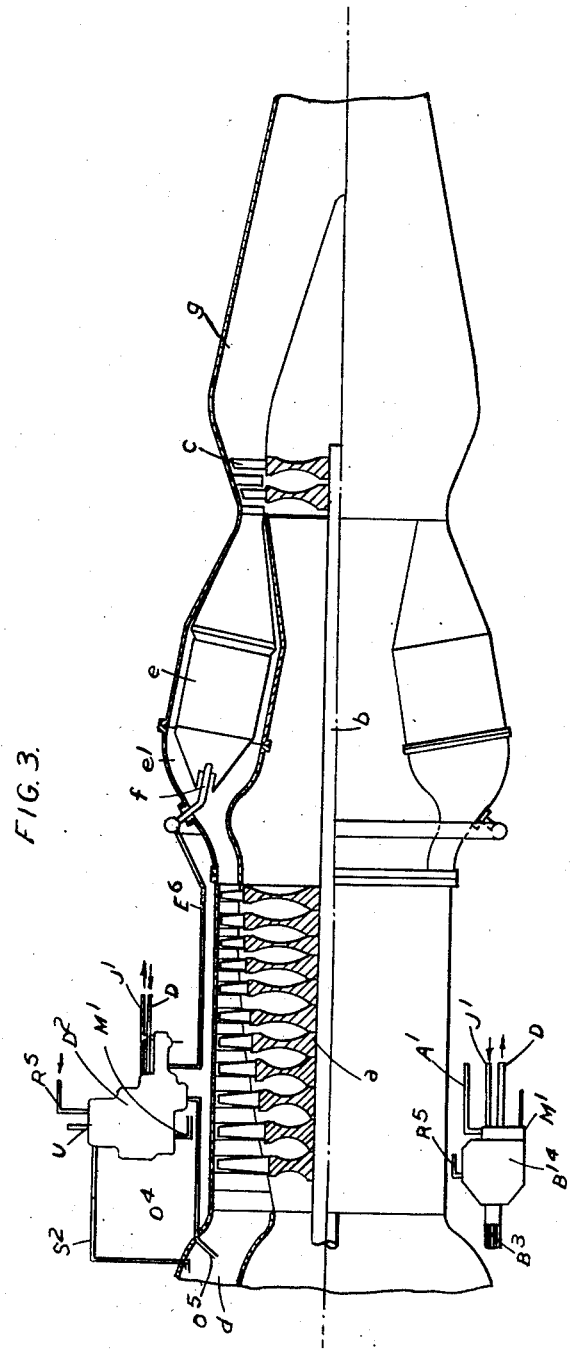

Patented Aug. 23, 1949

2,479,813

UNITED STATES PATENT OFFICE 2,479,813

FUEL FEED APPARATUS FOR GAS TURBINES

Reginald Henry Douglas Chamberlin and Charles Horace Lionel Wynne, London, and John Skellern, Northolt, England, assignors to D. Napier & Son Limited, London, England, a company of Great Britain Application July 1, 1947, Serial No. 758,440
In Great Britain June 3, 1946

Section 1, Public Law 690, August 8, 1946
Patent expires June 3, 1966

9 Claims. (Cl. 60—41)

This invention relates to apparatus for metering the fuel supplied to a prime mover unit of the type comprising a compressor which delivers air to one or more chambers in which fuel is burnt, the products of combustion from these chambers flowing to and acting on a turbine which drives the compressor.

The object of the present invention is to provide means for effecting automatically the metering of the fuel supplied to the burners of the combustion chambers of the prime mover in accordance with certain factors associated with the prime mover more especially when this is installed in an aircraft and drives a propeller.

The improved apparatus in accordance with this invention comprises in combination a metering orifice the dimensions of which in directions at right angles are determined by two relatively movable members, a variable delivery pump which supplies fuel to this metering orifice and is driven by and thus in speed relation to the prime mover, a tank from which fuel is drawn and supplied under pressure to the pump, means for moving and setting in relation to the metering orifice one of the said members which determines the dimensions of this orifice, such movement being in accordance with the temperature of the air as passing through the compressor of the prime mover, a servomotor operative to move the second of the said members which determines the dimensions of the metering orifice, this servomotor being controlled in accordance with the speed at which the fuel pump is driven in association with the pressure of the fuel as supplied to the pump, a second servomotor controlled by atmospheric pressure at the intake to the compressor and operative to vary the pressure exercised by a spring abutment on a capsule which is subjected to the differential action of the pressures on the opposite sides of the metering orifice, and means by which movement derived from movement of this capsule determines the volumetric delivery of the fuel pump. In the preferred construction the metering orifice is constituted by a sliding sleeve in which is at least one port shaped so that as the sleeve slides it will vary the dimension of the orifice in the circumferential direction, and a second sliding sleeve concentric with and surrounding the ported sleeve, the end of this second sleeve when it slides in relation to one or more ports in a fixed member and the ported sleeve effecting a variation in the dimension of the metering orifice in the axial direction with respect to the sleeves. The variable delivery fuel pump driven by the prime mover conveniently rotates in a casing and therein sets up a pressure due to centrifugal force which is thus dependent on the speed of rotation of the fuel pump which bears a definite relation to the speed of rotation of the turbine in the prime mover. By suitable means the second sleeve is caused to slide and is set in relation to the metering orifice and to the ported sleeve in accordance with the temperature of the air entering the turbine-driven compressor. A servomotor which is controlled in accordance with the speed at which the fuel pump is driven by the prime mover, that is to say in accordance with the speed of the prime mover, can slide the ported sleeve controlling the dimensions of the metering orifice, this control being in association with the pressure of the fuel as supplied from the fuel tank to the pump.

A second servomotor which is controlled by the atmospheric pressure at the intake to the compressor of the prime mover can vary the pressure exercised by a spring constituting one abutment for a capsule which is subjected to the differential action of the pressures on the opposite sides of the metering orifice. The volumetric delivery of the fuel pump will be determined by movement derived from this capsule. Preferably the port or each port in the ported sliding sleeve is V-shaped, being disposed with the apex of the V lying in the direction of the axis of the sleeve.

Thus the dimensions of the metering orifice are determined by the speed of the prime mover in association with the pressure at which the fuel is supplied to the pump and by the temperature of the air passing through the compressor, while delivery to the metering orifice is controlled that is to say the volumetric delivery by the pump, by the pressure of the air at the intake to the compressor in association with the differential effect of the fuel pressures on each side of the metering orifice.

The constructional details of the apparatus may vary but the accompanying drawings illustrate by way of example an arrangement of the apparatus as it may be employed in carrying the invention into practice.

In these drawings,

Figures 1 and 2, taken together, show diagrammatically the improved fuel metering apparatus.

Figure 3 shows diagrammatically an internal combustion turbine prime mover and the manner in which the improved metering apparatus may be associated therewith.

The fuel is contained in a tank A from which it is delivered under pressure through a pipe $A^1$ to a fuel pump B, the fuel on its way preferably passing through a filter $A^2$. The pump B is of the variable stroke and delivery type, and conveniently of a known construction as here shown. In this construction the variation of the strokes of the plungers $B^1$ is effected by altering the angular position of a swash plate $B^2$ in relation to the axis about which the pump rotates. The pump shaft $B^3$ is driven by suitable means either directly or indirectly from a rotating part of the prime mover which, as mentioned above, and for example, may be of a known type which includes a turbine driven by the products of combustion from one or more chambers wherein fuel is burnt in air which is delivered thereto by a compressor driven by the turbine. The variation in the stroke of the pump B is effected by a servomotor comprising a piston $B^4$ movable in a cylinder $B^5$ against the action of a spring $B^6$. This servomotor is controlled on the one hand by means dependent on movement derived from a capsule C (Figure 1) subject to the differential action of the fluid pressures on the opposite sides of the metering orifice. An abutment for the capsule C is adjustable in a manner to be described in dependence on the ram air pressure, that is the pressure at the entry to the compressor of the prime mover. Operation of the servomotor $B^4$, $B^5$ is also controlled by an overspeed control valve $B^7$ actuated in a known manner by the difference in pressures on the opposite sides of a diaphragm $B^8$. The diaphragm is situated in a chamber of which one part $B^9$ on one side of the diaphragm is in communication through a passage $B^{10}$ with the pipe $A^1$ through which the fuel is supplied from the tank A. The other part $B^{11}$ of the chamber enclosing the diaphragm $B^8$ is in communication through a passage $B^{12}$ with a chamber $B^{13}$ within a casing $B^{14}$ which encloses the pump B. Fluid contained in this chamber $B^{13}$ will act on the side of the diaphragm $B^8$ in the chamber $B^{11}$ with a pressure due to centrifugal action of the pump B this pressure being thus determined by the speed at which the pump is rotated, and it is thus in definite relation to the speed of rotation of the prime mover which drives the pump. The overspeed control valve $B^7$ is therefore actuated by the difference between the pressure at which the fuel is delivered to the pump B and a pressure which has a direct relation to the speed of the pump and the prime mover.

The pressures acting on the piston $B^4$ of the servomotor which effects the variation in the stroke of the pump B are on the one hand the pressure at which the fuel is delivered by the pump B through the pipe D which is in communication with one end of the cylinder through a passage $B^{15}$. On the other hand there is acting on the other face of the piston $B^4$ in addition to the spring $B^6$ operating fluid pressure transmitted through a pipe $M^1$. A passageway $B^{16}$ leading from this end of the cylinder $B^5$ terminates in an orifice controlled by the overspeed control valve $B^7$ which thus permits a leak off of the operative fluid pressure in the pipe M. There is a similar leak off of this pressure controlled in a manner to be described hereunder by the capsule C.

The metering orifice illustrated in Figure 1 is preferably constructed and arranged in the following way. The fuel is delivered by the pump B through the pipe D into a chamber $D^1$ within a closed casing $D^2$. In this chamber there is mounted a cylinder E which is open at both ends so that the fuel in the chamber $D^1$ can freely enter the cylinder. About the centre of the length of the cylinder E there is a circumferentially extending port or opening in the wall of the cylinder constituting an annular chamber $E^1$ into which the fuel enters after it is passed through the metering orifice. In what may be referred to for convenience as the upper end portion of the cylinder E there is fixed a sleeve $E^2$ having an edge $E^3$ which lies in a plane normal to the axis of the cylinder E and in a position where it extends across the opening into the annular chamber $E^1$. In the opposite or lower end portion of the cylinder E is a sleeve F which can slide in the cylinder, the upper and inner edge $F^1$ of this sleeve being so positioned that as the sleeve slides this edge will be moved across the opening into the chamber $E^1$. In this way the gap between the edge $F^1$ of the sliding sleeve which is straight and lies in a plane normal to the axis of the cylinder and the edge $E^3$ of the fixed sleeve $E^2$ can be varied in width thereby altering the dimension of the metering orifice in the direction of the cylinder axis. This gap between the opposed edges of the fixed sleeve $E^2$ and of the sliding sleeve F extends circumferentially through 360° but only a part of it is effectively open or uncovered for the flow of fuel by a port H in the wall of an inner sleeve $H^1$. Thus the fuel delivered by the pump into the chamber $D^1$ and thus into the interior of the sleeve $H^1$ will flow through the metering orifice G into the annular chamber $E^1$, the dimensions of the orifice G being variable by the relative positioning of the sleeves F and $H^1$. The outer sleeve F has the same thickness as the fixed sleeve $E^2$ so that the inner surfaces of these two sleeves, together constitute a cylinder of uniform internal diameter in whose wall is a gap the width of which in the axial direction can be varied according to the position into which the sleeve F is moved. In the cylinder thus formed by the fixed sleeve $E^2$ and the sliding sleeve F lies and can slide the inner sleeve $H^1$, and the port H in the wall of this sleeve is V-shaped as shown in Figure 1, the apex of this port extending in the direction of the axis of the sleeve, and, for example and as shown in the drawing, in what may be referred to as the upward direction. As it is shown for example in Figure 1 this port H has a shape which resembles an isosceles triangle with a short base and sides which are not straight but similarly and slightly curved inwards towards each other. When this sleeve $H^1$ is in its initial position of rest the centre part in the length of the port lies across the above-mentioned circumferential gap which surrounds the sleeve $H^1$ and is formed between the edge $E^3$ of the fixed sleeve $E^2$ and the edge $F^1$ of the sliding sleeve F. Where the port H and this gap coincide there is formed the metering orifice or passage G whose dimension in the circumferential direction will be varied by sliding the sleeve $H^1$. On the other hand as already mentioned the dimension of this metering orifice G in the axial direction can be varied by sliding the outer sleeve F so as to alter the width of the gap through which the metered fuel is delivered into the annular chamber $E^1$.

In the second chamber $D^3$ within the casing $D^2$ which contains the above mentioned parts constituting the variable metering orifice G is the pressure sensitive capsule C which has been already referred to. For convenience this may be designated the metering pressure capsule and its interior is subject to the pressure of the fuel as delivered by the pump B this pressure being transmitted through the passage $D^4$ which puts the interior of the capsule in communication with the chamber $D^1$ into which as described this fuel is delivered through the pipe D. The interior of the chamber $D^3$ is filled with fuel which has passed through the metering orifice G, this chamber $D^3$ being in communication through a passage $D^5$ with the annular chamber $E^1$. Thus the exterior of the capsule C is subjected to the pressure of the fuel after it has passed through the metering orifice G, this being the pressure at which fuel is delivered to the burners. In some cases it may be convenient to reverse this arrangement so that the exterior of the metering pressure capsule C will be subject to the pressure of the fuel after it has passed through the metering orifice G while the interior of this capsule will then be in communication with the chamber $D^1$ and thus subject to the pressure of the fuel as delivered by the pump.

At one end the capsule C bears against a fixed abutment constituted by the partition wall $D^6$ within the casing $D^2$, but at its other end the capsule carries a spindle $C^1$ which can slide through an opening in an adjacent part of the wall of the casing $D^2$. A part intermediate in the length of the spindle $C^1$ lies in and passes across a closed chamber J which conveniently contains fuel at the pressure at which it left the supply tank A and goes to the pump B. This fuel enters the chamber J through a passage $J^1$ which communicates with the fuel supply pipe $A^1$. A lever extends transversely across this intermediate part in the length of the spindle $C^1$ to which the lever is pivotally connected at $C^2$. The end of one arm K of this lever is fulcrumed at $K^1$ in a suitable place in the wall $J^2$ of the chamber J. The other arm $K^2$ of this lever carries at its end an adjustable stud $K^3$ which makes contact with a lever L pivoted at $L^1$ and carrying a valve $L^2$ controlling the opening M at the end of piping $M^1$ leading from the servomotor cylinder $B^5$. When this valve $L^2$ is lifted it allows a leak-off into the chamber J of the fluid pressure acting in the manner described above on one side of the piston $B^4$ of the servomotor which varies the stroke of the fuel pump B. A spring $L^3$ tends to move the lever L in a direction which will keep the valve $L^2$ on its seat in the opening M.

At its outer end $C^3$ the spindle $C^1$ bears through a cap $C^4$ on one end of a coiled spring $C^5$ whose other end through a cap $C^6$ bears on a cam lever member N pivoted at $N^1$. In this lever member N is a cam slot $N^2$ and movement of this lever, which is effected in a manner to be described, varies the pressure exerted by the spring $C^5$ on the capsule C.

The movements necessary to alter the dimensions of the metering orifice G are effected on the one hand by variations in the temperature of the air at the intake to the compressor of the power unit, and on the other hand by the speed of the motor in this unit in association with the pressure of the fuel as delivered from the tank A to the fuel pump B. Movement is imparted to the outer sleeve F by a Bourdon tube O which is connected in a known manner not shown in the drawing to a thermostat, such as a mercury in steel thermometer, situated in the air intake to the compressor. A rod $F^2$ runs for example downwards, from the sleeve F through the wall $D^2$ enclosing the chamber $D^1$ into the chamber J which as mentioned contains fuel at the pressure at which it flows from the tank A to the pump B. The port end of this rod $F^2$ is acted on by a spring $F^3$ which tends to move the sleeve F downwards, that is in a direction which will increase the width of the gap between the edge $F^1$ of the sleeve F and the edge $E^3$ of the fixed sleeve $E^2$, this movement thus increasing the dimension of the metering orifice G in the direction of the sleeve axis. The end $F^4$ of the rod $F^2$ is connected to the free end of a lever $O^1$ whose other end is fulcrumed at $O^2$ in an eccentric bearing which permits adjustment. At a point $O^3$ in the length of the lever $O^1$ it is connected to one end of the Bourdon tube O, the other end of this tube being carried by the wall $J^2$ of the chamber J and suitably connected to the thermometer.

From the upper end of the inner sleeve $H^1$ a rod $H^2$ passes through the wall $D^2$ of the chamber $D^1$ and is connected at its end to the piston P of a servomotor. This piston P can move in a cylinder $P^1$ and is acted on by a spring $P^2$ which through the piston P tends to move the sleeve $H^1$ in a direction which, owing to the shape and disposition of the port H, will reduce the size of the metering orifice G. At a point $H^3$ in its length this rod $H^2$ is connected to the end of one arm Q of a lever which is pivoted at $Q^1$ in an eccentric bearing which permits of adjustment. The other arm $Q^2$ of this lever is connected to a ported sleeve $Q^3$ within which lies and can move a piston valve R. The sleeve $Q^3$ and the valve R together control the flow of pressure fluid to and from the ends of the cylinder $P^1$ of the servomotor, this flow taking place through passages $P^3$ and $P^4$. Movement of the sleeve $Q^3$ varies the positions of ports $Q^4$ and $Q^5$ in this sleeve in relation to the ends of the passages $P^3$, $P^4$, thus varying the control of the flow through these passages as effected by the piston R. The piston R is connected through a rod $R^1$ to a pressure sensitive capsule $R^2$ disposed in a chamber $R^3$ which is in communication through a passage $R^4$ with the passage $J^1$, this passage as already mentioned being in communication with the fuel supply pipe $A^1$ so that the chamber $R^2$ contains fuel at the pressure at which it is delivered from the tank A to the pump B. At the end opposite to that which is connected to the rod $R^1$ the capsule $R^2$ abuts against the wall of the chamber $R^3$ and the interior of the capsule is connected through piping $R^5$ and passage $B^{12}$ with the chamber $B^{13}$ in which rotates the fuel pump B. The interior of the capsule $R^2$ is thus subjected to pressure due to the centrifugal force set up by the liquid in the chamber $B^{13}$ and this is a pressure which varies according to the speed of rotation of the pump B which is related to the speed of rotation of the prime mover.

An exhausted pressure sensitive capsule S is disposed in a chamber $S^1$ which is subject through the pipe $S^2$ to the air pressure, commonly referred to as the ram pressure, at the intake to the compressor in the power unit. Where this unit is installed in an aircraft this ram pressure at the intake will be much above the normal atmospheric pressure while the aircraft is in flight. At one end this capsule S bears against an abutment constituted by the wall $S^3$ of the casing enclosing the chamber $S^1$ and while this abutment is in effect fixed it is as shown adjustable by the screw $S^4$ for primary setting purposes. At its other end the capsule is connected through a rod $S^5$ with a piston valve $S^6$ which controls the flow of pressure fluid to the cylinder T of a servomotor. This pressure fluid is supplied through a pipe U from a suitable source both to the servomotor T and to the servomotor P. The piston $T^1$ in the cylinder T has a spring $T^2$ acting on one side of it and from the opposite side runs a rod $T^3$, this rod being suitably guided where it passes through the end of the cylinder T and at its outer end in the wall of the casing of the apparatus. At a convenient point in the length of the piston rod $T^3$ is a pin or roller $J^4$ which engages the cam slot $N^2$ in the lever N. At another point $T^5$ in the length of the piston rod $T^3$ it is connected to one arm V of a lever pivoted at $V^1$ in an eccentric bearing, the other arm $V^2$ of this lever being connected to a ported sliding sleeve $V^3$ within which moves the piston valve $S^6$. Movement of the sleeve $V^3$ will set the ports $V^4 V^5$ therein in relation to the piston valve $S^6$ and the passages $T^6 T^7$ through which the pressure liquid flows from the piping U to the oposite ends of the servo cylinder T. Movement of the piston $T^1$ of this servomotor would thus not only adjust the position of the sleeve $V^3$ but also through the cam lever N vary the strength of the spring $C^5$ which constitutes one abutment for the metering pressure capsule C. In this way this spring $C^5$ will be automatically adjusted in accordance with the air pressure at the intake to the compressor in the power unit.

Though in the above description the sleeve F whose movement determines one of the dimensions of the metering orifice G is described as sliding in relation to the sleeve $E^2$ which is mentioned as being fixed, it is to be understood that under certain circumstances this sleeve $E^2$ may be so arranged that its position in the fixed cylinder E can be adjusted. It is desirable however that this sleeve $E^2$ should in fact be maintained in a substantially constant position and thus in effect fixed when the selected and actual speeds of the power unit are the same, but means may be provided however for imparting a sliding movement to this sleeve under certain conditions and thus applying a supplementary variation in the dimensions of the metering orifice G.

In some cases it may be desirable to provide the inner sleeve $H^1$ with more than the one port H as in the construction described above. For instance, in this sleeve there may be two preferably similar ports placed conveniently in diametrically opposite positions, each port then having an area which is one-half of the area of the single port. Like the single port H each of these two ports will then be shaped somewhat if not exactly like an isosceles triangle with a small base. For example, each port may be shaped as one-half of the single port H when the latter is divided longitudinally by a straight line running from the centre of the base to the apex, but the separate ports may be otherwise shaped if desired.

A power unit of the type indicated and as provided with the above described improved fuel metering apparatus is more especially intended to be used for the propulsion of an aircraft, as for instance by a propeller, this propeller having variable pitch blades controlled by a governor. This air screw governor is preferably under servomotor control and is not mechanically connected to the metering apparatus though such a connection may be arranged if desired so as to be operative, for example, at starting. The metering apparatus responds to the centrifugal pressure head in the chamber $B^{13}$ within which rotates the fuel pump B and this pressure varies as the square of the actual turbine revolutions per minute. By this means the fuel flow depends on the actual R. P. M. and is not therefore susceptible to metering errors due to variation between selected and actual turbine speeds which are otherwise liable to occur. The response of the present apparatus to changes of air intake total head pressure is arranged so that the metering pressure varies as the square of the change in the total head with the result that the flow change varies linearly as is desirable. With the response of the apparatus to changes in air intake temperature there is obtained a percentage correction which increases linearly with decrease in air temperature.

There is provided a shut-off valve W in the passage $E^4$ through which the fuel flows to the burners from the chamber $E^1$ after passing through the metering orifice G. This shut-off valve W may be, for example, of known construction and arranged so as to co-operate with a spring-actuated non-return valve $E^5$. This valve $E^5$, as shown in Figure 1, may be a conical one seating in the mouth of the passage $E^4$ leading to the chamber $E^1$. Beyond this valve the passage $E^4$ branches off conveniently at an angle as shown in Figure 2, and opposite to this branch is arranged a cylinder $W^1$ in which slides the valve W constituted by a plunger which can be moved through the lever $W^2$, a toothed quadrant $W^3$ and a toothed rack $W^4$ at the side of the plunger until the end of this plunger acting as the valve W enters the part of the passage $E^4$ opposite thereto and behind the non-return valve $E^5$. This will shut off the flow to the burners. Conveniently the plunger valve W is hollow so that the fuel under pressure in the passage $E^4$ can have access to the interior of the cylinder $W^1$ behind the plunger. By movement of the lever $W^2$ and consequent movement of the valve W the fuel flow to the burners can be shut off or the passage $E^4$ left clear for this fuel to flow freely from the metering orifice G to the burners.

Figure 3 shows by way of example an internal combustion turbine prime mover of a type with which the present invention is more especially but not exclusively intended to be employed.

The prime mover is here shown as an axial flow compressor $a$ on a shaft $b$ which is driven by a turbine $c$. Air is drawn into the compressor through an intake $d$ and is delivered into a number of separate combustion chambers $e$ spaced equally apart around the shaft $b$. Each combustion chamber $e$ has an air jacket $e^1$ and the air from the compressor $a$ flows into the combustion chamber $e$ past a burner $f$ while some of this air flows through the jacket $e^1$. Hot gases from the combustion chambers $e$ act on the blades of the turbine $c$ and then flow away through the passage $g$ whence they may issue in the form of a propulsive jet. A propeller, not shown in the drawing, may be driven by the turbine through the shaft $b$.

The casing $D^2$ enclosing all the part of the metering apparatus shown in Figure 1 is disposed in a position such as indicated in Figure 3 at one side of the casing enclosing the compressor $a$. In a convenient position opposite to the casing $D^2$ and as shown in the drawing there is placed the casing $B^{14}$ enclosing the fuel pump whose shaft $B^3$ is driven through gearing not shown off the turbine shaft B.

The several pipes and connections between the metering apparatus and the casing $D^2$ and the fuel pump in the casing $B^{14}$ are indicated by the same letters of reference as these parts are indicated in Figures 1 and 2. Thus the piping S² leads from the air intake d so as to transmit the pressure at the air intake to the chamber S¹ enclosing the capsule S. There is a connection O⁴ between a thermostat O⁵ in the air intake d and the thermostat tube O which transmits movement to the lever O¹. The pipe U communicates with the supply of liquid under pressure which acts on the servo pistons P and T¹. The piping R⁵ is the communication between the pump and the speed capsule R². The piping J¹ is the return to the fuel pump while the piping D is that through which fuel is delivered by the pump to the metering unit in the casing D². The piping E⁶ leads the metered fuel from the delivery E⁴ to the burners f in the combustion chambers e. Finally the pipe M¹ leads to the servo cylinder containing the piston B⁴ whose movement varies the stroke of the fuel pump.

What we claim as our invention and desire to secure by Letters Patent is:

1. Apparatus for metering the fuel supplied to a prime mover of the type indicated comprising in combination a metering orifice the dimensions of which in directions at right angles are determined by parts of two relatively movable members, a pump operative to deliver fuel in variable quantity to the metering orifice, means for driving the pump by and thus in speed relation to the prime mover, a tank containing fuel under pressure with means for supplying fuel from this tank to the said pump, means for moving and setting in relation to the said metering orifice one of the said members which determines the dimensions of this orifice these means being actuated in accordance with the temperature of the air at the entry to the compressor of the prime mover, a servo-motor operative to move the second of the said members which determines the dimensions of the said metering orifice, means whereby this servo-motor is controlled on the one hand in accordance with the speed at which the fuel pump is driven and on the other hand in accordance with the pressure of the fuel as supplied to the said fuel pump, a second servo-motor with means for controlling it in accordance with the pressure of the air at the intake to the compressor of the prime mover, a member movable against a spring constituting an abutment the member being subjected on the one hand to the pressure of the fuel as delivered by the said pump and on the other hand and oppositely to the pressure of the fuel which has passed through the said metering orifice, means whereby the said second servo-motor is operative to vary the pressure exercised by the said spring abutment on the said movable member, and means whereby movement derived from the said movable member determines the setting of the stroke of the said fuel pump.

2. Apparatus for metering fuel as claimed in claim 1 and in which the metering orifice and the parts which determine its dimensions comprise an open-ended cylinder with a port opening in its wall through which the fuel which is delivered by the said pump into the end of the cylinder can flow for combustion in the prime mover, a sleeve positioned in said cylinder with one end running in the circumferential direction across the said port opening in the cylinder wall, a second sleeve which can slide in said cylinder with one end running in the circumferential direction across said port opening and opposite to the end of the said first sleeve so that movement of the second sleeve will vary the width of the gap between the opposed ends of said sleeves and thus the width in the axial direction of the said port opening in the cylinder wall, a third and inner sleeve which can slide within said first and second sleeves and has in it at least one port extending in the axial direction and varying in width that is in the circumferential direction, movement of said third sleeve in the axial direction varying the dimension in the circumferential direction of the metering orifice which is constituted by said port in the third and inner sleeve and the said gap between the ends of the said first and second sleeves.

3. Apparatus for metering fuel as claimed in claim 2, in which the said third or inner sliding sleeve whose movement determines the dimensions of the metering orifice has therein at least one port which is V-shaped and is disposed with the apex of the V lying in the direction of the axis of the sleeve along which the sleeve is moved.

4. Apparatus for metering fuel supplied to a prime mover of the type indicated comprising in combination a metering orifice constituted by relatively movable members which determine its dimensions, these members comprising an open-ended cylinder with a port opening in its wall through which the fuel passing through the metering orifice can flow for combustion in the prime mover, a sleeve positioned in said cylinder with one end running in the circumferential direction across the said port opening in the cylinder wall, a second sleeve which can slide in said cylinder with one end running in the circumferential direction across said port opening and located opposite to the end of the said first sleeve so that movement of the second sleeve in the direction of its axis will vary the width of the gap between the opposed ends of said sleeves and thus the width in the axial direction of the said port opening in the cylinder wall, a third and inner sleeve which can slide within the said first and second sleeves and has in it at least one port extending in the axial direction and varying in width, that is in the circumferential direction, movement of said third sleeve in the axial direction varying the dimension in the circumferential direction of the metering orifice through the gap between the ends of the first and second sleeves, a pump operative to deliver fuel in variable quantity to the interior of the said cylinder and sleeves therein and so to the metering orifice, means for driving the pump by and thus in speed relation to the prime mover, a tank containing fuel under pressure with means for supplying fuel from this tank to the said pump, means for moving and setting the said second sleeve and thus determining the width of the gap leading into the port opening in the wall of the cylinder, such means being actuated in accordance with the temperature of the air at the interior to the compressor of the prime mover, a servomotor operative to move the said third and inner sleeve which with the second sleeve determines the dimensions of the metering orifice, means whereby this servomotor is controlled on the one hand in accordance with the speed at which the fuel pump is driven and on the other hand in accordance with the pressure of the fuel as supplied to the said fuel pump, a second servo-motor with means for controlling it in accordance with the pressure of the air at the intake to the compressor of the prime mover, a member such as a capsule movable against a spring constituting an abutment the member being subjected on the one hand to the pressure of the fuel as delivered by the said pump and before this fuel has passed through the metering orifice and being subjected on the other hand and oppositely to the pressure of the fuel which has passed through the said metering orifice, means whereby the said second servomotor is operative to vary the pressure exercised by the said spring abutment on the said movable member, and means whereby movement derived from the said movable member determines the setting of the stroke of the said fuel pump.

5. Apparatus for metering fuel as claimed in claim 1, in which the said variable stroke fuel pump is disposed in a casing wherein rotation of the pump sets up a pressure due to centrifugal force which is thus dependent on the speed of rotation of the fuel pump and bears a definite relation to the speed of rotation of the prime mover, and means whereby the pressure in this casing is utilised to control the said servomotor which actuates one of the said two relatively movable members by which the dimensions of the metering orifice are determined.

6. Apparatus for metering fuel as claimed in claim 4, in which the said cylinder with the said second and third sleeves therein whose positions determine the dimensions of the metering orifice is disposed in a chamber into which fuel is delivered by the said pump, connections being provided and carried through the walls of the chamber and respectively between the said second and sliding sleeve and a lever actuated in accordance with the temperature at the intake to the compressor and between the said third or inner sliding sleeve and the piston of the servomotor which actuates this sleeve.

7. Apparatus for metering fuel as claimed in claim 4, in which there is a capsule mounted between a fixed part and a spring constituting an abutment the capsule being subject on the one hand to the pressure of the fuel as delivered by the said pump and before it reaches the metering orifice and on the other hand and oppositely to the pressure of the fuel which has passed through the said metering orifice, the pressure exercised by the said spring abutment on the said capsule being varied by the action of the said second servomotor which is controlled in accordance with the pressure of the air at the intake to the compressor of the prime mover.

8. Apparatus for metering fuel as claimed in claim 4, in which in a closed chamber there is a capsule subjected on the one hand to pressure set up by centrifugal force or liquid in a casing enclosing the said fuel pump and on the other hand to the pressure of the fuel as supplied to the said fuel pump, the said capsule being connected to a piston valve which controls the flow of pressure liquid from a source of supply to the said servomotor which is operative to actuate the said inner sleeve whose movement determines the dimensions of the metering orifice.

9. Apparatus for metering fuel as claimed in claim 4, in which there is an evacuated capsule disposed in a casing the capsule being subjected in this casing to the pressure of the air at the intake to the compressor of the prime mover, this capsule being connected to a piston valve which controls the flow of pressure liquid from the source of supply to the said second servomotor which is operative to vary the pressure exercised by the said spring abutment on the said movable member and thereby determines the setting of the stroke of the said fuel pump.

REGINALD HENRY
    DOUGLAS CHAMBERLIN.
CHARLES HORACE
    LIONEL WYNNE.
JOHN SKELLERN.

No references cited.